US007653084B2

(12) United States Patent
Shin et al.

(10) Patent No.: US 7,653,084 B2
(45) Date of Patent: Jan. 26, 2010

(54) BANDWIDTH ALLOCATION DEVICE FOR GUARANTEEING QOS IN ETHERNET PASSIVE OPTICAL ACCESS NETWORK

(75) Inventors: Dong Beom Shin, Daejeon (KR); Yool Kwon, Busan (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 686 days.

(21) Appl. No.: 11/321,581

(22) Filed: Dec. 29, 2005

(65) Prior Publication Data

US 2007/0071031 A1    Mar. 29, 2007

(30) Foreign Application Priority Data

Sep. 28, 2005   (KR) ................. 10-2005-0090751
Oct. 10, 2005   (KR) ................. 10-2005-0095137

(51) Int. Cl.
*H04J 3/16*  (2006.01)
*H04L 12/28*  (2006.01)
*H04W 4/00*  (2009.01)
*H04B 10/02*  (2006.01)
*H04J 14/00*  (2006.01)

(52) U.S. Cl. .............. 370/468; 370/395.42; 370/329; 398/66; 398/130

(58) Field of Classification Search ............ 370/468, 370/395.1, 389, 390, 400, 395.21, 395.4, 370/395.42, 230, 236, 449, 447, 485, 486, 370/487; 359/123, 125, 135, 119; 398/99, 398/52, 58, 75, 98, 63, 71, 72

See application file for complete search history.

(56) References Cited

U.S. PATENT DOCUMENTS 5,978,374 A * 11/1999 Ghaibeh et al. ........ 370/395.43

| 6,546,014 | B1 * | 4/2003 | Kramer et al. ......... 370/395.41 |
| 6,771,599 | B1 | 8/2004 | Aoyama et al. |
| 7,327,679 | B2 * | 2/2008 | Naor et al. .................. 370/232 |
| 7,362,704 | B2 * | 4/2008 | Sisto et al. .................. 370/230 |
| 7,362,975 | B2 * | 4/2008 | Choi et al. ..................... 398/58 |
| 7,436,765 | B2 * | 10/2008 | Sisto et al. .................. 370/230 |

(Continued)

FOREIGN PATENT DOCUMENTS

| JP | 2001-127762 A | 5/2001 |
| JP | 2005-12800 A | 5/2001 |
| JP | 2001-251331 A | 9/2001 |
| JP | 2002-9805 A | 1/2002 |
| JP | 2002-204245 A | 7/2002 |
| JP | 2003-69627 A | 3/2003 |

*Primary Examiner*—Hanh Nguyen
(74) *Attorney, Agent, or Firm*—Ladas & Parry LLP

(57) ABSTRACT

An apparatus and method for allocating a bandwidth for up-stream data transmission to a plurality of Optical Network Units (ONUs) in an Ethernet Passive Optical Access Network (EPON) in which the ONUs are connected to a single Optical Line Terminal (OLT) are disclosed. The bandwidth allocation method for guaranteeing a Quality of Service (QoS) in the EPON includes the steps of: a) classifying up-stream data to be transmitted from a plurality of Optical Network Units (ONUs) of the EPON to an Optical Line Terminal (OLT) into a plurality of classes according to predetermined data priority information, and requesting bandwidths required for individual classes from the OLT; b) allowing the OLT to perform a bandwidth distribution process according to bandwidth requirement quantities of individual classes using weights pre-assigned to individual classes; and c) allowing the OLT to distribute a residual bandwidth acquired after the bandwidth distribution process is performed from among an available total up-stream bandwidth to the ONUs.

17 Claims, 8 Drawing Sheets

U.S. PATENT DOCUMENTS

| | | |
|---|---|---|
| 7,483,632 B2 * | 1/2009 | Sung et al. .................... 398/63 |
| 7,539,211 B2 * | 5/2009 | Oh et al. ..................... 370/468 |
| 2001/0028633 A1 | 10/2001 | Shimada et al. |
| 2002/0085492 A1 | 7/2002 | Mukai et al. |
| 2002/0114042 A1 | 8/2002 | Ichibangase et al. |
| 2004/0252714 A1 | 12/2004 | Oh et al. |

* cited by examiner

300

| ONU # | Reported Queues from ONU | | | R T T |
|---|---|---|---|---|
| | P1(Priority1) | P2(Priority2) | P3(Priority3) | |
| 1 | $R_{11}$ | $R_{12}$ | $R_{13}$ | $RTT_1$ |
| 2 | $R_{21}$ | $R_{22}$ | $R_{23}$ | $RTT_2$ |
| 3 | $R_{31}$ | $R_{32}$ | $R_{33}$ | $RTT_3$ |
| · | | | | · |
| · | $R_{i1}$ | $R_{i2}$ | $R_{i3}$ | · |
| · | | | | · |
| N | $R_{11}$ | $R_{11}$ | $R_{11}$ | $RTT_N$ |
| Sum | $S_1 = \sum_{i=1}^{N} R_{i1}$ | $S_2 = \sum_{i=1}^{N} R_{i2}$ | $S_3 = \sum_{i=1}^{N} R_{i3}$ | |

| ONU# | Primary-step bandwidth allocation | | | Secondary-step bandwidth allocation | Total |
|---|---|---|---|---|---|
| | P1 | P2 | P3 | | |
| 1 | $G_{11}$ | $G_{12}$ | $G_{13}$ | $RG_1$ | $G_1$ |
| 2 | $G_{21}$ | $G_{22}$ | $G_{23}$ | $RG_2$ | $G_2$ |
| 3 | $G_{31}$ | $G_{32}$ | $G_{33}$ | $RG_3$ | $G_3$ |
| • | • | • | • | • | |
| • | $G_{i1}$ | $G_{i2}$ | $G_{i3}$ | $RG_i$ | $G_i$ |
| • | • | • | • | • | |
| N | $G_{N1}$ | $G_{N2}$ | $G_{N3}$ | $RG_N$ | $G_N$ |
| Sum | $G_1 = \sum_{i=1}^{N} G_{i1}$ | $G_2 = \sum_{i=1}^{N} G_{i2}$ | $G_3 = \sum_{i=1}^{N} G_{i3}$ | $RG = \sum_{i=1}^{N} RG_i$ | |

FIG. 6

BANDWIDTH ALLOCATION DEVICE FOR GUARANTEEING QOS IN ETHERNET PASSIVE OPTICAL ACCESS NETWORK

RELATED APPLICATION

The present application is based on, and claims priority from, Korean Application Number 2005-90751, filed Sep. 28, 2005, and Korean Application Number 2005-95137, filed Oct. 10, 2005, the disclosure of which is incorporated by reference herein in its entirety.

BACKGROUND OF THE INVENTION

1. Field of the Invention

The present invention relates to an Ethernet Passive Optical Access Network (EPON) system, and more particularly to an apparatus and method for allocating a bandwidth for up-stream data transmission to a plurality of Optical Network Units (ONUs) in the EPON system in which the plurality of ONUs are connected to a single Optical Line Terminal (OLT).

2. Description of the Related Art

Typically, an Access Network (AN) is indicative of a communication area positioned between a service provider (e.g., Central Office (CO), a Head-End, or a Point-of-Presence (POP), etc.) and a service subscriber capable of receiving a specific service from the service provider.

Presently, a variety of networks are widely used as the aforementioned Access Network (AN), for example, currently xDSL networks (e.g., an Asymmetric Digital Subscriber Line (ADSL), and a Very high-data rate Digital Subscriber Line (VDSL)) based on a telephone line via which low-speed data and voice-oriented data are processed, and a Hybrid Fiber Coaxial (HFC) network serving as an optical/coaxial hybrid network, etc.

However, as technologies of a high-speed Internet, a high-speed LAN (Local Area Network), and a home network have recently been developed, and a variety of applications (e.g., a voice data service and a multimedia streaming service, etc.) required for the aforementioned technologies have been rapidly developed, an amount of a bandwidth required for an Access Network (AN) is rapidly increased, and the xDSL network based on a telephone line and the HFC network based on a coaxial cable cannot satisfy the aforementioned rapidly-increasing AN bandwidth requirement.

With the increasing development of a variety of communication services such as VOD-, CATV-, and HDTV-services, such that many developers have recently conducted intensive research into the implementation of high-speed Internet traffic and an Access Network (AN) which uses an optical line in a Broadband Convergence Network (BCN) environment. Specifically, a Passive Optical Network (PON) system has long been considered to be the most appropriate alternative network for an FTTx (Fiber To The x) scheme in technical-, economical-, and evolutional-aspects of communication networks.

Although the PON system and associated technologies have been initially developed for an Asynchronous Transfer Mode (ATM) network, the ATM PON (APON) based on ATM technologies has not been widely used by users due to a variety of problems (i.e., system complexity, high costs, Ethernet-based subscriber traffic increase, and difficulty of video service accommodation, etc.). Recently, the EPON (Ethernet PON) standardization based on the IEEE 802.3ah EFM (Ethernet in the First Mile) task force has been completed. The EPON technology transmits an Ethernet frame to a destination without modifying a protocol of the Ethernet frame in a passive optical line arranged between a subscriber and a Central Office (CO), such that it is more cost-effective than conventional networks based on telephone- and coaxial-lines. As a result, many developers have recently conducted intensive research into the aforementioned EPON technology, and a variety of companies have currently manufactured chips capable of satisfying a prescribed EPON standard. Recently, a variety of Access Networks (ANs) based on the EPON system have rapidly come into widespread use.

FIG. 1 is a block diagram illustrating a structure for transmitting up-stream data and down-stream data in a conventional Ethernet EPON system, and its operation principles.

Referring to FIG. 1, a conventional EPON system includes an Optical Line Terminal (OLT) 100, a splitter 105, and a plurality of Optical Network Units (ONUs) 110, 120, and 130. The EPON system includes a PTM (Point-To-Multipoint) structure in which the ONUs 110, 120, and 130 share the OLT 100 via a single optical fiber. In other words, a down-stream transmission scheme for transmitting data from the OLT 100 to the ONUs 110, 120, and 130 is implemented with a broadcast scheme. On the contrary, an up-stream transmission scheme for transmitting data from the ONUs 110, 120, and 130 to the OLT 100 is implemented with a MTP (Multipoint-To-Point) scheme.

The OLT 100 is located at the CO (Central Office). The ONUs 110, 120, and 130 collect subscriber traffic generated from a plurality of subscriber terminals (also called user terminals) 140~145. The splitter 150 connects the single OLT 100 to the plurality of ONUs 110, 120, and 130 according to a specific ratio of 1:N, such that an optical distribution network between the OLT 100 and the ONUs 110, 120, and 130 is formed. Down-stream traffic 160 configured in the form of broadcast data is transmitted to a destination in the EPON system, such that it is similar to conventional Ethernet traffic. However, the up-stream transmission is implemented when the ONUs 110, 120, and 130 simultaneously transmit the up-stream traffic 150 to the single OLT 100. For example, the OLU 110 for use in the EPON system shares network resources with other ONUs 120 and 130 to transmit up-stream traffic L1, and the OLT 100 controls access authority of the shared network resources of the ONUs 110, 120, and 130. Therefore, a method for evenly and effectively allocating a bandwidth and a Multi Point Control Protocol (MPCP) are employed, such that they prevent an unexpected data collision from being generated when a tree-structure EPON system transmits up-stream data, and an effective bandwidth allocation process is executed. The easiest method from among a plurality of up-stream data transmission methods is a fixed bandwidth allocation scheme capable of dividing a bandwidth into sub-bandwidths according to the number of the registered ONUs 110, 120, and 130, and allocating the sub-banwidths to the ONUs 110, 120, and 130, respectively.

However, the fixed bandwidth allocation scheme has difficulty in supporting Quality of Service (QoS), and cannot provide individual ONUs 110, 120, and 130 with different bandwidths instead of the same bandwidths although there is a spare bandwidth in an overall bandwidth. A variety of dynamic bandwidth allocation methods have been proposed to obviate the aforementioned problems of the fixed bandwidth allocation scheme. A representative method from among the dynamic bandwidth allocation methods is an Interleaved Polling with Adaptive Cycle Time (IPACT) method. The IPACT method enables the OLT 100 to transmit a gate message to the next ONU 120 according to down-stream transmission before a current ONU 110 having transmission authority performs the last transmission. In more detail, if individual ONUs 110, 120, and 130 performs up-stream data transmission according to the gate message of the OLT 100, they inform the OLT 100 of buffer information of the ONUs 110, 120, and 130, such that the dynamic bandwidth allocation process can be performed. However, although the IPACT method provides different bandwidths according to the buffer information of the ONUs 110, 120, and 130, it can distinguish individual traffic requirement characteristics from each other on the condition that a variety of traffics having different characteristics are mixed, such that it has difficulty in providing an appropriate QoS.

SUMMARY OF THE INVENTION

Therefore, the present invention has been made in view of the above problems, and it is an object of the present invention to provide an apparatus and method for guaranteeing a QoS of up-stream data transmitted from at least one ONU to an OLT in an EPON system, and implementing dynamic bandwidth allocation of the up-stream data.

In accordance with one aspect of the present invention, the above and other objects can be accomplished by the provision of a bandwidth allocation method for guaranteeing a Quality of Service (QoS) in an Ethernet Passive Optical Access Network (EPON) comprising the steps of: a) classifying up-stream data to be transmitted from a plurality of Optical Network Units (ONUs) of the EPON to an Optical Line Terminal (OLT) into a plurality of classes according to pre-determined data priority information, and requesting bandwidths required for individual classes from the OLT; b) allowing the OLT to perform a bandwidth distribution process according to bandwidth requirement quantities of individual classes using weights pre-assigned to individual classes; and c) allowing the OLT to distribute a residual bandwidth acquired after the bandwidth distribution process is performed from among an available total up-stream bandwidth to the ONUs.

In accordance with another aspect of the present invention, there is provided a bandwidth allocation apparatus for guaranteeing a Quality of Service (QoS) in an Ethernet Passive Optical Access Network (EPON) comprising: a plurality of Optical Network Units (ONUs) for classifying up-stream data to be transmitted to an Optical Line Terminal (OLT) into a plurality of classes according to predetermined data priority information in the EPON, and receiving bandwidths required for individual classes from the OLT; and the OLT for distributing a bandwidth from among an available total up-stream bandwidth to the ONUs according to bandwidth requirement quantities of individual classes using weights pre-assigned to individual classes, and re-distributing a residual bandwidth to the ONUs.

In accordance with yet another aspect of the present invention, there is provided an Optical Network Unit (ONU) apparatus for use in an Ethernet Passive Optical Access Network (EPON) comprising: a plurality of priority Queues for classifying the up-stream data to be transmitted to an Optical Line Terminal (OLT) according to individual classes in the order of predetermined data priority information, and storing the classified up-stream data; and a scheduler for transmitting the up-stream data stored in the priority Queues to the OLT according to bandwidth allocation information received from the OLT, wherein a bandwidth assigned by the OLT is acquired when the OLT distributes a bandwidth from among an available total up-stream bandwidth to the ONUs having requested the bandwidth from the OLT according to bandwidth requirement quantities of individual classes using pre-assigned bandwidths of individual classes, and re-distributes a residual bandwidth to the ONUs.

In accordance with yet another aspect of the present invention, there is provided an Optical Line Terminal (OLT) apparatus for use in an Ethernet Passive Optical Access Network (EPON) comprising: a storage unit for classifying up-stream data to be transmitted from a plurality of Optical Network Units (ONUs) into a plurality of classes according to predetermined data priority information, and storing a bandwidth requirement table which includes bandwidth requirement quantities of individual priorities associated with the ONUs and information of a distance to individual ONUs; and a bandwidth allocation unit for distributing a bandwidth to the ONUs according to the bandwidth requirement quantities of individual classes using pre-assigned weights of individual classes, and re-distributing a residual bandwidth to the ONUs.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a bandwidth management table for managing an ONU's bandwidth requirement using an OLT in accordance with a preferred embodiment of the present invention;

FIG. 6 is a table illustrating a bandwidth allocation result acquired by a two-stage bandwidth allocation process in accordance with a preferred embodiment of the present invention;

DESCRIPTION OF THE PREFERRED EMBODIMENTS

Figure 1:
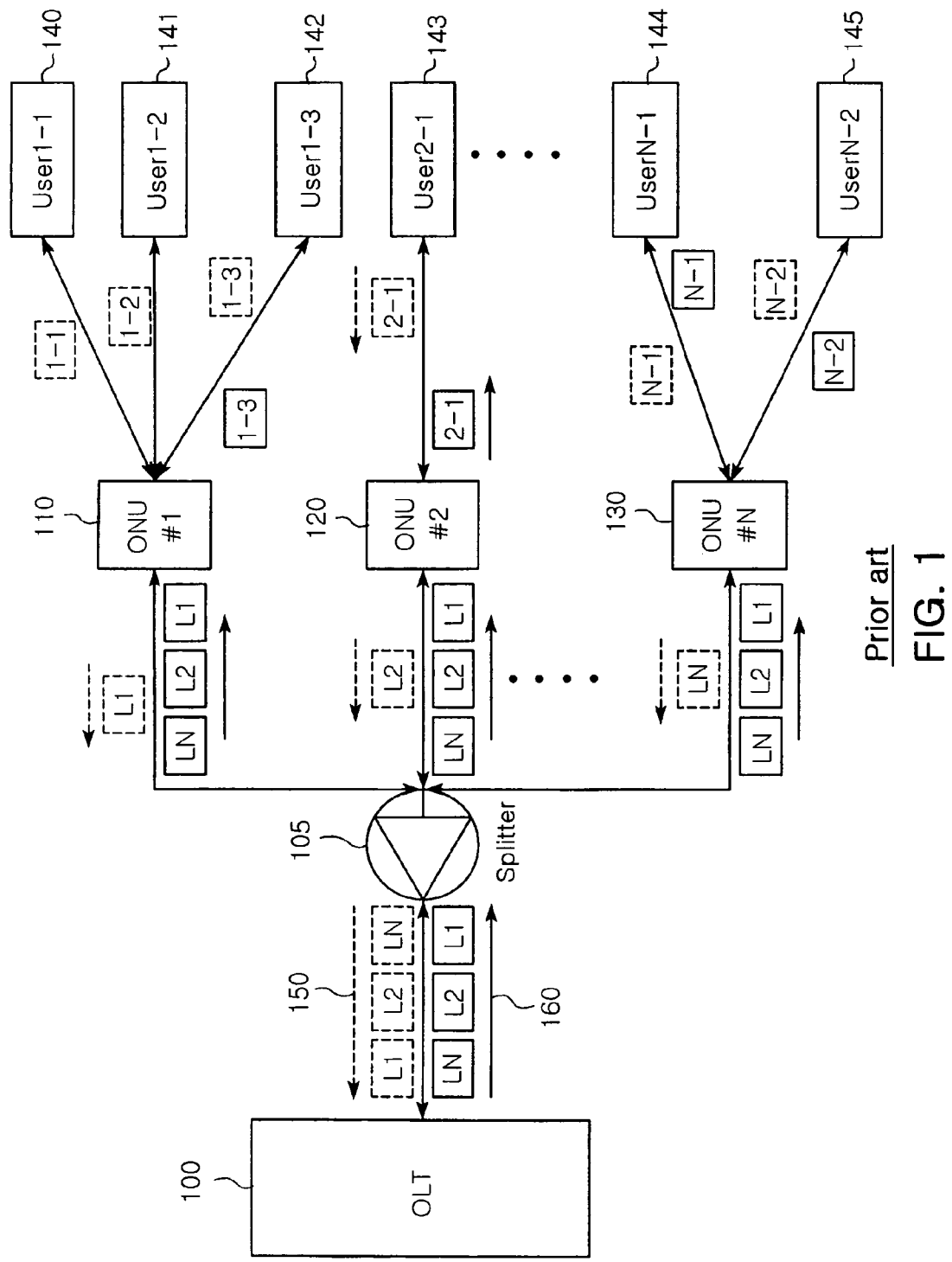
FIG. 1 is a block diagram illustrating a structure for transmitting up-stream data and down-stream data in a conventional Ethernet EPON system, and its operation principles.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
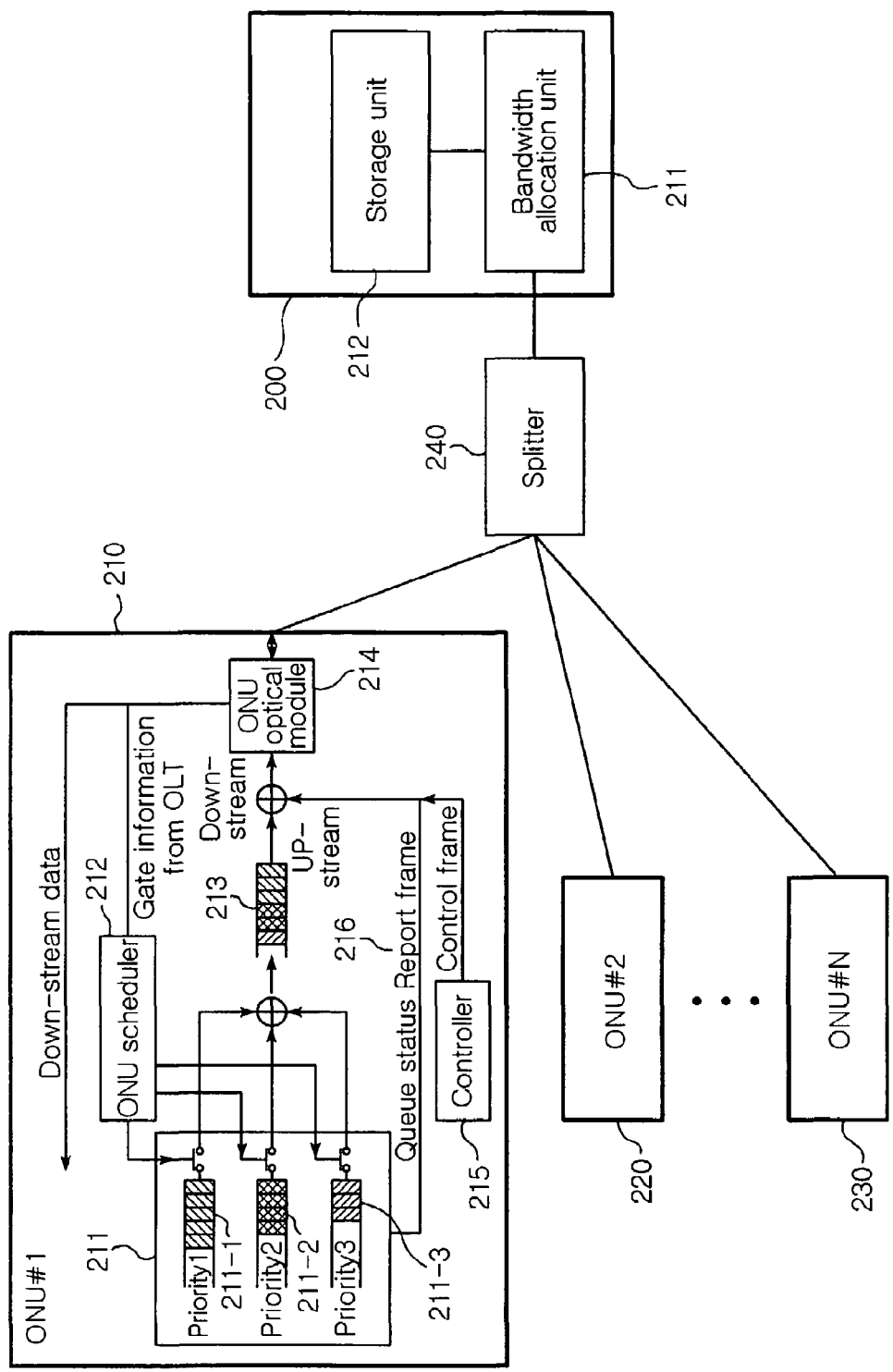
FIG. 2 is a block diagram illustrating a bandwidth allocation apparatus for guaranteeing a QoS in an EPON system in accordance with a preferred embodiment of the present invention.

FIG. 2 is a block diagram illustrating a bandwidth allocation apparatus for guaranteeing a QoS in an EPON system in accordance with a preferred embodiment of the present invention.

Referring to FIG. 2, a bandwidth allocation apparatus for guaranteeing a QoS in an EPON system according to the present invention includes a plurality of ONUs 210, 220, and 230 and an OLT 200. The single OLT 200 and the ONUs 210, 220, and 230 are connected to each other via the splitter 240 according to a predetermined ratio of 1:N, such that an optical distribution network is formed between the OLT 200 and the ONUs 210, 220, and 230.

Each ONU 210, 220, or 230 includes a priority Queue 211 compose of a plurality of priority Queues 211-1 to 211-3, an ONU scheduler 212, an up-stream Queue 213, and an ONU optical module 214. A plurality of user terminals (not shown) are connected to individual ONUs 210, 220, and 230. Up-stream data received from individual user terminals is classified into a plurality of classes according to priority information. For example, the plurality of classes may be a first priority class (Priority-1) associated with first traffic, a second priority class (Priority-2) associated with second traffic equal to multimedia traffic, and a third priority class (Priority-3) associated with third traffic. In this case, the first traffic requires a guaranteed service (e.g., E1/T1) from among data entered by the user terminal, and has very weak resistance to jitters and a delay. The second traffic equal to the multimedia traffic has very weak resistance to the delay. The third traffic requires a best-effort service (e.g., an E-mail or FTP service) less sensitive to the delay. The priority Queue 211 composed of priority Queues 211-1 to 211-3 store data received from the user terminal in corresponding priority queues 211-1 to 211-3. For example, first data corresponding to the first priority class (Priority-1) is stored in the first priority (Priority-1) Queue 211-1. Second data corresponding to the second priority class (Priority-2) is stored in the second priority (Priority-2) Queue 211-2. Third data corresponding to the third priority class (Priority-3) is stored in the third priority (Priority-3) Queue 211-3.

The ONU scheduler 212 transmits up-stream data stored in the aforementioned priority Queue 211 to the OLT 200 via the up-stream Queue 213 according to multiple GRANT information including up-stream bandwidth allocation quantity information contained in a GATE frame message received from the OLT 200.

The up-stream Queue 213 transmits individual output data of the priority queue 211 to the ONU optical module 214 according to a data output order of the aforementioned output data.

The ONU optical module 214 transmits output data of the up-stream Queue 213 and a Queue Status Report Frame 216, which includes Queue status information acquired from the aforementioned priority Queue 211, using a light source, and receives down-stream data and gate information from the OLT 200.

The controller 215 controls the aforementioned output data of the up-stream Queue 213 and the aforementioned Queue Status Report Frame 216 to be transmitted to the OLT 200 via the ONU optical module 214 using a control frame.

In this way, information of the up-stream data Queue 211 of the ONUs 210, 220, and 230 is configured in the form of a REPORT frame 216 indicating information of the ONUs 210, 220, and 230, and is then transmitted to the OLT 200 via the ONU optical module 205.

The OLT 200 includes a bandwidth allocation unit 211 and a storage unit 212. The OLT 200 receives the REPORT frames indicating status information of the priority queue 211 from the ONUs 210, 220, and 230, distributes a bandwidth to the ONUs 210, 220, and 230 according to bandwidth requirements of individual classes using pre-allocated bandwidths of the individual classes from among an available total up-stream bandwidth, and re-distributes a residual bandwidth to the ONUs 210, 220, and 230.

The bandwidth allocation unit 211 calculates up-stream bandwidths required for individual classes of the ONUs 210, 220, and 230 using the REPORT frames received from the ONUs 210, 220, and 230. The bandwidth allocation unit 211 distributes a bandwidth to the ONUs 210, 220, and 230 according to bandwidth requirements of individual classes using the pre-allocated bandwidths of individual classes from among an available total up-stream bandwidth, and distributes a residual bandwidth to the ONUs 210, 220, and 230. The up-stream bandwidth allocation quantity calculated by the bandwidth allocation unit 211 via schedulers of individual classes contained in the ONUs 210, 220, and 230 is re-transmitted to the ONUs 210, 220, and 230 via a GATE frame.

The ONUs 210, 220, and 230 receives the GATE frame. The ONU scheduler 212 transmits up-stream data stored in the Queue 211 for each class to the OLT 200 via a single up-stream Queue 213 according to multiple GRANT information contained in the received GATE frame.

The storage unit 212 stores the bandwidth requirement quantity for each priority in association with individual ONUs 210, 220, and 230, and a bandwidth requirement table having distance information between each of the ONUs 210, 220, and 230, and the OLT 200.

FIG. 3 is a bandwidth management table for managing an ONU's bandwidth requirement using an OLT in accordance with a preferred embodiment of the present invention.

Referring to FIG. 3, the bandwidth management table 300 is contained in the OLT 200, and integratedly manages REPORT information of all the ONUs 210, 220, and 230 registered in the OLT 200.

The bandwidth management table 300 includes bandwidth requirement quantities 301, 302, and 303 of three priorities of individual ONUs 210, 220, and 230, and a Round-Trip-Time (RTT) value 304 indicative of distance information between the ONUs 210, 220, and 230 to the OLT 200.

If the bandwidth management table 300 calculates the sum of bandwidth requirement quantities of individual priorities, the sum of bandwidth requirement quantities of the first priority (Priority-1) is equal to $$S_1 = \sum_{i=1}^{N} R_{i1}$$

301, where i is indicative of an ONU's number, and 1 is indicative of a first priority (Priority-1). The sum of bandwidth requirement quantities of the second priority (Priority-2) is equal to $$S_2 = \sum_{i=1}^{N} R_{i2}$$

302, and the sum of bandwidth requirement quantities of the third priority (Priority-3) is equal to $$S_3 = \sum_{i=1}^{N} R_{i3}$$

303.

Figure 4:
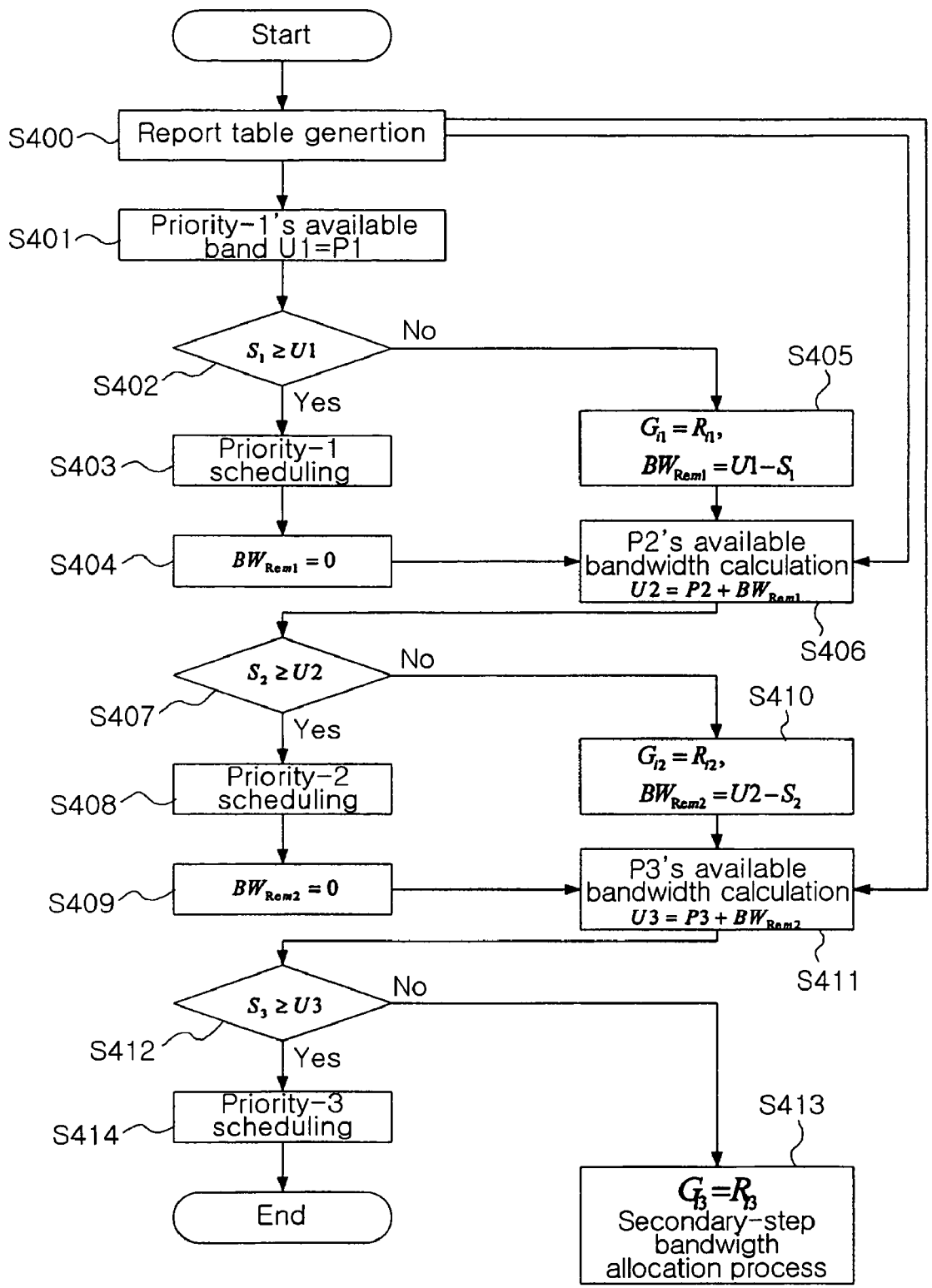
FIG. 4 is a flow chart illustrating an operation process for allowing an OLT to perform a primary-step bandwidth allocation process in consideration of priority in accordance with a preferred embodiment of the present invention.

FIG. 4 is a flow chart illustrating an operation process for allowing an OLT to perform a primary-step bandwidth allocation process in consideration of priority in accordance with a preferred embodiment of the present invention.

Referring to FIG. 4, a bandwidth management table 300 for integrating REPORT information of all ONUs is formed at step S400. A bandwidth available for the first priority (Priority-1) from among an available overall up-stream bandwidth is recognized on the basis of individual priority weights entered by an administrator or operator at step S401. According to the present invention, if the OLT 200 performs bandwidth scheduling associated with bandwidth requirements of individual ONUs 210, 220, and 230 according to priority information, it is preferable that the administrator or operator may directly enter weights P1, P2, and P3 of individual priorities via a CPU interface, such that various priorities suitable for various environmental services can be provided. Provided that the aforementioned priority weights entered by the administrator are referred to as P1, P2, and P3, a bandwidth U1 available for the first priority (Priority-1) is denoted by P1.

Referring to the bandwidth management table 300 shown in FIG. 3, the bandwidth requirement quantity of the first Priority (Priority-1) is denoted by $$S_1 = \sum_{i=1}^{N} R_{i1}.$$

It is determined whether the value of $S_1$ is equal to or higher than the value of U1 at step S402. If it is determined that the value of $S_1$ is equal to or higher than the value of U1 at step S402, the bandwidth U1 assigned to the first priority (Priority-1) is distributed to an object $R_{i1}$ having requested the first priority (Priority-1) bandwidth using a packet scheduling algorithm based on a round-robin scheme at step S403. In this case, the value of $S_1$, is equal to or higher than the value of U1, such that a residual bandwidth $BW_{REM1}$ acquired after the bandwidth assigned to the first priority (Priority-1) is distributed to the object $R_{i1}$ is performed is zero at step S404. If the value of $S_1$ is less than the value of U1, the residual bandwidth acquired after a requested bandwidth is distributed to the object $R_{i1}$ having requested the first priority (Priority-1) bandwidth is calculated by the following Equation 1 at step S405:

$$BW_{REM1} = U1 - S_1 = P1 - \sum_{i=1}^{N} R_{i1} \quad \text{[Equation 1]}$$

The bandwidth $BW_{REM1}$ remains in the first priority (Priority-1), such that an available bandwidth available for the weight P2 is denoted by $U2=P2+BW_{REM1}$, and is calculated by the following Equation 2 at step S406:

$$U2 = P2 + BW_{REM1} = P1 + P2 - \sum_{i=1}^{N} R_{i1} \quad \text{[Equation 2]}$$

Referring to the bandwidth management table 300 shown in FIG. 3, the bandwidth requirement quantity of the second Priority (Priority-2) is denoted by $$S_2 = \sum_{i=1}^{N} R_{i2}.$$

It is determined whether the value of $S_2$ is equal to or higher than the value of U2 at step S407. If it is determined that the value of $S_2$ is equal to or higher than the value of U2 at step S407, the bandwidth U2 assigned to the second priority (Priority-2) is distributed to an object $R_{i2}$ having requested the second priority (Priority-2) bandwidth using the packet scheduling algorithm based on the round-robin scheme at step S408. In this case, the value of $S_2$ is equal to or higher than the value of U2, such that a residual bandwidth $BW_{REM}$ acquired after the bandwidth assigned to the second priority (Priority-2) is distributed to the object $R_{i2}$ is performed is zero at step S409. If the value of $S_2$ is less than the value of U2, the residual bandwidth acquired after a requested bandwidth is distributed to the object $R_{i2}$ having requested the second priority (Priority-2) bandwidth is calculated by the following Equation 3 at step S410:

$$BW_{REM2} = U2 - S_2 = \quad \text{[Equation 3]}$$
$$P1 + P2 - \sum_{i=1}^{N} R_{i1} - \sum_{i=1}^{N} R_{i2} = P1 + P2 - \sum_{i=1}^{N} (R_{i1} + R_{i2})$$

The bandwidth $BW_{REM2}$ remains in the second priority (Priority-2), such that an available bandwidth available for the weight P3 is denoted by $U3=P3+BW_{REM2}$, and is calculated by the following Equation 4 at step S411:

$$U3 = P3 + BW_{REM2} = P1 + P2 + P3 - \sum_{i=1}^{N} (R_{i1} + R_{i2}) \quad \text{[Equation 4]}$$

Referring to the bandwidth requirement table 300 shown in FIG. 3, the bandwidth requirement quantity of the third Priority (Priority-3) is denoted by $$S_3 = \sum_{i=1}^{N} R_{i3}.$$

It is determined whether the value of $S_3$ is equal to or higher than the value of U3 at step S412. If it is determined that the value of $S_3$ is equal to or higher than the value of U3 at step S412, the bandwidth U3 assigned to the third priority (Priority-3) is distributed to an object $R_{i3}$ having requested the third priority (Priority-3) bandwidth using the packet scheduling algorithm based on the round-robin scheme at step S414, such that a primary-step bandwidth allocation process is completed. If the value of $S_3$ is less than the value of U3, the residual bandwidth acquired after a requested bandwidth is distributed to the object $R_{i3}$ having requested the third priority (Priority-3) bandwidth is distributed to all ONUs registered in the OLT, such that a secondary-step bandwidth allocation step is performed at step S413.

If bandwidth allocation processes of individual classes are completed via the aforementioned bandwidth allocation process, the OLT 200 transmits bandwidths assigned to individual classes to the ONUs 210, 220, and 230 via the GATE message. The ONUs 210, 220, and 230 transmit up-stream data on the basis of bandwidth allocation quantities for every class contained in the GATE message. If there is a residual up-stream bandwidth allocation quantity, data of an ONU's high-priority Queue is firstly transmitted. However, after the ONUs 210, 220, and 230 transmit the REPORT message on the basis of their Queue information during the bandwidth allocation process based on the REPORT and GATE messages between the OLT 200 and the ONUs 210, 220, and 230, new up-stream data may be generated. If the OLT 200 calculates the sum of GATE values assigned to the ONUs 210, 220, and 230, and transmits the calculated sum of GATE values, and newly-generated up-stream data is at a P1-grade, a Light Load Penalty problem may occur, such that only P1-grade up-stream data is firstly provided by a scheduler contained in the ONU, and low-priority data cannot be actually provided although it is continuously required of the OLT. Therefore, the present invention additionally performs a secondary-step bandwidth allocation process to solve the aforementioned Light Load Penalty problem.

Figure 5:
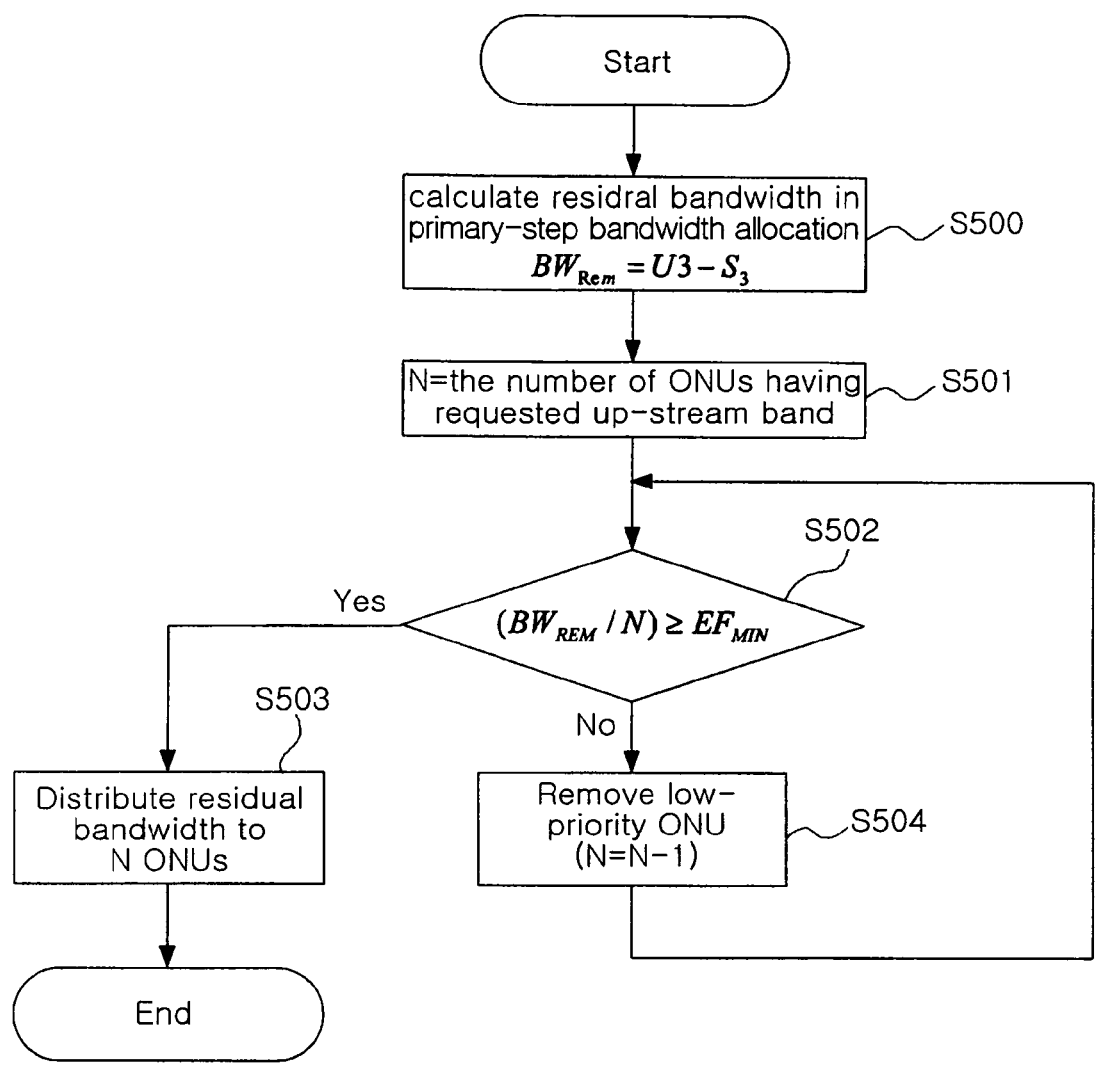
FIG. 5 is a flow chart illustrating an operation process for allowing an OLT to perform a secondary-step bandwidth allocation process during which the OLT distributes a residual bandwidth having been left after the primary-step bandwidth allocation process show in FIG. 4 in accordance with a preferred embodiment of the present invention.

FIG. 5 is a flow chart illustrating an operation process for allowing an OLT to perform a secondary-step bandwidth allocation process during which the OLT distributes a residual bandwidth having been left after the primary-step bandwidth allocation process show in FIG. 4 in accordance with a preferred embodiment of the present invention.

Referring to FIG. 5, a residual bandwidth $BW_{REM}$ acquired after a bandwidth allocation process is performed via the aforementioned primary-step bandwidth allocation process shown in FIG. 4 is calculated by the following Equation 5 at step S500.

$$BW_{REM} = U3 - S_3 \quad \text{[Equation 5]}$$
$$= P1 + P2 + P3 - \sum_{i=1}^{N}(R_{i1} + R_{i2}) - \sum_{i=1}^{N} R_{i3}$$
$$= P1 + P2 + P3 - \sum_{i=1}^{N}(R_{i1} + R_{i2} + R_{i3})$$

With reference to Equation 5, a residual bandwidth $BW_{REM}$ corresponds to a residual bandwidth acquired after bandwidths requested by the ONUs 210, 220, and 230 from among an available total up-stream bandwidth are allocated to the ONUs 210, 220, and 230 during the aforementioned primary-step bandwidth allocation process.

After the value of $BW_{REM}$ is calculated as described above, the value of N is determined to be the number of all ONUs 210, 220, and 230 having requested the up-stream bandwidth at step S501. It is determined whether the value of $$\frac{BW_{REM}}{N}$$

is equal to or higher than an effective Ethernet frame size value $EF_{MIN}$ at step S502.

If it is determined that the value of $$\frac{BW_{REM}}{N}$$

is equal to or higher than the effective Ethernet frame size $EF_{MIN}$ at step S502, bandwidths depending on the value of $$\frac{BW_{REM}}{N}$$

are allocated to individual ONUs at step S503.

If it is determined that the value of $$\frac{BW_{REM}}{N}$$

is less than the effective Ethernet frame size $EF_{MIN}$ at step S502, the N value is reduced, such that the value of $$\frac{BW_{REM}}{N}$$

is higher than the effective Ethernet frame size $EF_{MIN}$. In this case, the ONUs 210, 220, and 230 having different low ONU priorities are removed one by one from the ONU unit composed of the ONUs 210, 220, and 230 according to the order of the aforementioned ONU priorities, such that the value of N is reduced. According to the present invention, it is assumed that Ethernet traffic includes self-similarity characteristics, and it is also assumed that a predetermined weight is assigned to an ONU, which has used a residual bandwidth assigned for a previous cycle. In this case, a high weight is assigned to an ONU having used a residual bandwidth assigned for the latest cycle, and a low weight is assigned to an ONU having used a residual bandwidth assigned for the old cycle, and no weight is assigned to an ONU having not used such a residual bandwidth, such that a low-priority ONU is removed at step S504.

FIG. 6 is a table illustrating a bandwidth allocation result acquired by a two-stage bandwidth allocation process in accordance with a preferred embodiment of the present invention.

Referring to FIG. 6, the value of $G_{i1}$ 600 is equal to a first priority (P1)'s bandwidth allocation value assigned to the i-th ONU during the primary-step bandwidth allocation process. The value of $G_{i2}$ 601 is equal to a second priority (P2)'s bandwidth allocation value assigned to the i-th ONU during the primary-step bandwidth allocation process. The value of $G_{i2}$ 602 is equal to a first priority (P3)'s bandwidth allocation value assigned to the i-th ONU during the primary-step bandwidth allocation process. The value of $RG_i$ 403 is indicative of a residual bandwidth allocation value assigned to the i-th ONU during the secondary-step bandwidth allocation process. The value of $G_i$ 404 is indicative of the sum of all bandwidth values assigned to the i-th ONU during the primary- and secondary-step bandwidth allocation processes.

According to the present invention, if four GATE values $G_{i1}$, $G_{i2}$, $G_{i3}$, and $RG_i$ of the i-th ONU are determined during the aforementioned two-stage bandwidth allocation process, the OLT transmits the GATE values $G_{i1}$, $G_{i2}$, $G_{i3}$, and $RG_i$ assigned to individual ONUs using the Gate message. In this way, the present invention can effectively distribute an up-stream bandwidth of the EPON system to individual ONUs according to priority information, and can provide a QoS.

Figure 7:
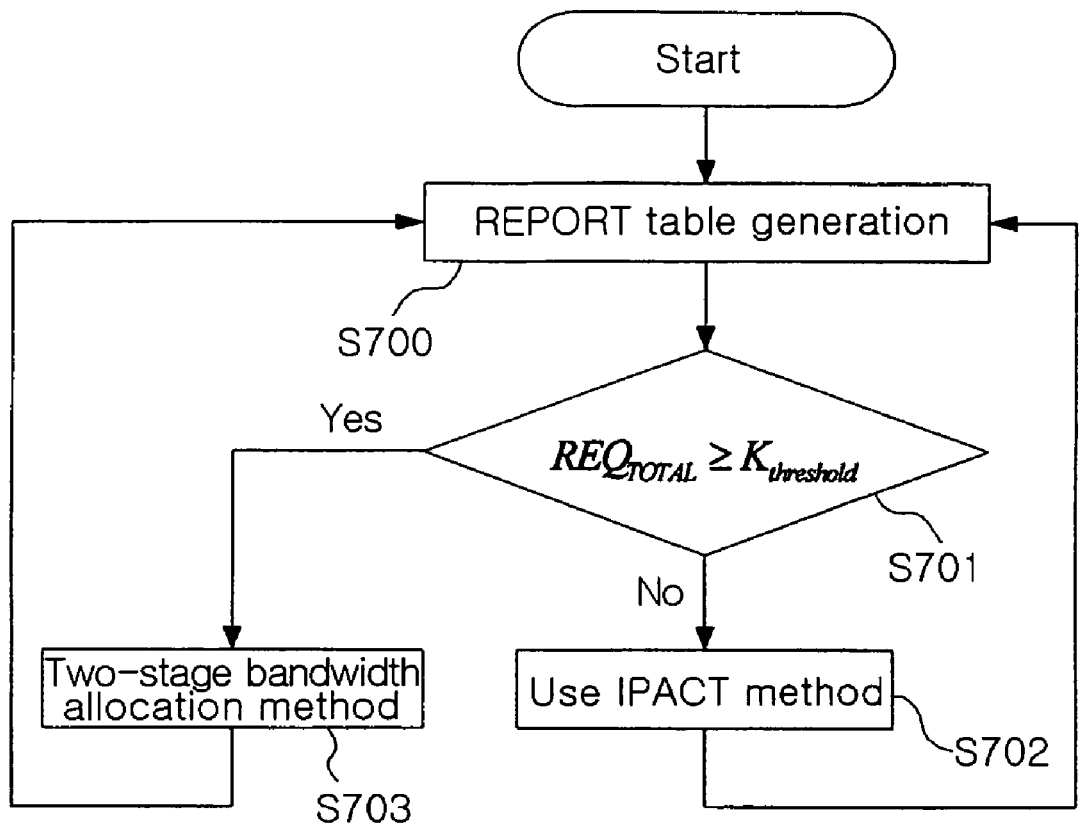
FIG. 7 is a flow chart illustrating a process for determining a time at which a two-stage bandwidth allocation method is applied according to the present invention.

FIG. 7 is a flow chart illustrating a process for determining a time at which a two-stage bandwidth allocation method is applied according to the present invention.

Referring to FIG. 7, the conventional IPACT (Interleaved Polling with Adaptive Cycle Time) method uses an interleaved polling method in the PON system, changes a polling cycle according to up-stream traffic requirement quantities of the ONUs, and increases efficiency of an EPON's up-stream channel. However, the IPACT method may unavoidably encounter the loss of data when the sum of up-stream traffics requested by the ONUs is higher than a threshold value pre-determined on the basis of a pre-allocated 1-cycle processing time. If there is no limitation in the aforementioned 1-cycle processing time, traffic data highly sensitive to a delay and jitters is transmitted may not be actually used although transmission of the traffic data is performed. Therefore, in order to solve the aforementioned problems, the present invention forms a REPORT table 300 shown in FIG. 3 on the basis of the REPORT message of individual ONUs at step S700. A threshold value $K_{Threshold}$ is pre-determined on the basis of the 1-cycle processing time by referring to the REPORT table 300. The sum $REQ_{TOTAL}$ of upward traffics requested by the ONUs is compared with the aforementioned threshold value $K_{Threshold}$ at step S701.

If the sum $REQ_{TOTAL}$ of upward traffics requested by the ONUs is equal to or higher than the aforementioned threshold value $K_{Threshold}$ at step S701, the two-stage bandwidth allocation method proposed by the present invention is used at step S702. Otherwise, if the sum $REQ_{TOTAL}$ of upward traffics requested by the ONUs is less than the aforementioned threshold value $K_{Threshold}$ at step S701, the conventional IPACT method is used at step S702.

Figure 8:
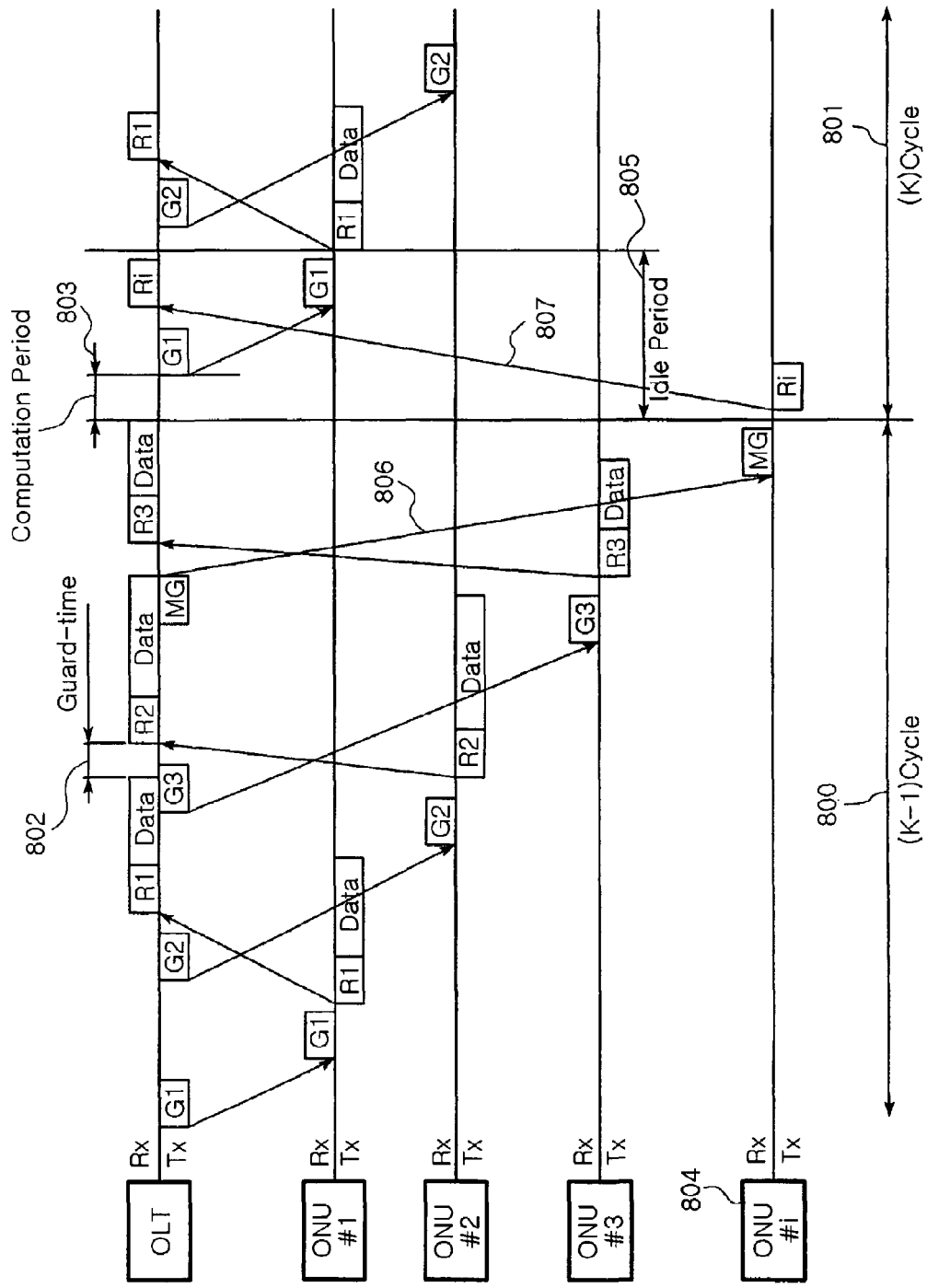
FIG. 8 is a conceptual diagram illustrating a method for effectively receiving a REPORT message of an ONU, which has not transmitted the REPORT message during a previous cycle, in a bandwidth allocation method of a fixed cycle according to the present invention.

FIG. 8 is a conceptual diagram illustrating a method for effectively receiving a REPORT message of an ONU, which has not transmitted the REPORT message during a previous cycle, in a bandwidth allocation method of a fixed cycle according to the present invention.

The two-stage bandwidth allocation method according to the present invention is a method for allocating a bandwidth according to a predetermined fixed cycle. As shown in FIG. 8, the size of a (K−1)Cycle 800 is equal to that of the (K)Cycle 801. The two-stage bandwidth allocation method according to the present invention is based on an "Interleaved Polling with Stop" method capable of determining a GRANT value of the next cycle on the basis of a REPORT message of an one cycle.

The "Interleaved Polling with Stop" method uses a residual guard time 802 which prevents a data collision from being generated when ONUs transmit up-stream data in an one cycle.

However, if there is no residual bandwidth in the primary-step bandwidth allocation process as previously stated in FIG. 4, the ONUs, which have not transmitted the REPORT message to the OLT during a previous cycle, may be unable to continuously request their bandwidths.

In order to solve the aforementioned problems, a computation period 803 during which a GRANT value to be used for a current cycle "(K)cycle" 801 is calculated is located at a predetermined time next to the last end of the previous period "(K−1)Cycle" 800. An Up-stream band enters an idle mode during a predetermined time from the computation period 803 to a transmission time at which a first ONU transmits up-stream data in the "(K−1)cycle" period 801. The present invention receives REPORT messages of the ONUs, which have not transmitted the REPORT messages in a previous cycle, using the up-stream idle band 805. Firstly, the OLT transmits a multicast message to an ONU group, which has not requested the REPORT message in a previous cycle whereas it is discovery-processed at the last section of the "(K−1)Cycle" period 800, at step S806. A specific ONU, which desires to transmit a new REPORT message, from among ONUs having received the multicast message transmits a REPORT message, and requests an up-stream band at step 807. In this case, the requested up-stream band is calculated by a band computation algorithm at the last section of the "(K)Cycle" period 801, such that a requested bandwidth of the next period "(K+1)cycle" is allocated.

A bandwidth allocation method for guaranteeing a QoS in the EPON system according to the present invention can be implemented in a computer-readable recording medium in the form of computer-readable codes. The aforementioned computer-readable recording medium includes all kinds of recording devices in which data readable by a computer system is stored, for example, a ROM, a RAM, a CD-ROM, a magnetic tape, a floppy disc, and an optical data storage device, etc. Also, the computer-readable recording medium can also be implemented in the form of carrier-waves in the same manner as in data transmission via the Internet. The computer-readable recording medium can store prescribed codes, which are distributed to computer systems interconnected via a network such that they can be read by the computer systems.

As apparent from the above description, a bandwidth allocation device according to the present invention can effectively distribute up-stream data transmitted from an ONU to an OLT in an EPON system according to priority information, resulting in the implementation of a guaranteed QoS.

In addition, in the case where new up-stream data occurs after the ONU transmits the REPORT message to the OLT on the basis of its priority Queue information in a bandwidth allocation process based on the REPORT- and GATE-messages between the ONU and the OLT, the bandwidth allocation device according to present invention can actually provide low-priority data, such that it can effectively transmit the new up-stream data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bandwidth allocation method for guaranteeing a Quality of Service (QoS) in an Ethernet Passive Optical Access Network (EPON) comprising:

classifying up-stream data received from a plurality of user terminals to be transmitted from a plurality of Optical Network Units (ONUs) of the EPON to an Optical Line Terminal (OLT) into a plurality of classes according to predetermined data priority information, and requesting bandwidths required for individual classes from the OLT;

allowing the OLT to perform a bandwidth distribution process according to bandwidth requirement quantities of individual classes using weights pre-assigned to individual classes; and allowing the OLT to distribute a residual bandwidth acquired after the bandwidth distribution process is performed from among an available total up-stream bandwidth to the ONUs, wherein the up-stream data is received from each of the plurality of user terminals is classified into the plurality of classes, and wherein the allowing the OLT to distribute the residual bandwidth acquired after the bandwidth distribution process is performed from among the available total up-stream bandwidth to the ONUs includes the step of:

if the residual bandwidth $BW_{REM}$ is less than bandwidths requested by the ONUs, excluding a low-priority ONU according to a predetermined ONU priority until a value $$\frac{BW_{REM}}{N}$$

acquired when the residual bandwidth $BW_{REM}$ is divided by a predetermined number N equal to the number of ONUs is higher than a minimum Ethernet frame transmission time, and allocating an up-stream bandwidth larger than a bandwidth corresponding to the minimum Ethernet frame transmission time to high-priority ONUs.

2. The method according to claim 1, wherein the allowing of the OLT to perform the bandwidth distribution process according to the bandwidth requirement quantities of the individual classes using the weights pre-assigned to the individual classes further comprises:
  allowing the OLT to configure a table associated with bandwidth requirement quantities of individual ONUs; and
  sequentially distributing pre-assigned bandwidths of individual classes according to the bandwidth requirement quantities of the classes in the order from the highest-priority class to the lowest-priority class, and allocating a residual bandwidth acquired after each of the highest-priority class to the lowest-priority class bandwidth distribution is finished to the next-lower-priority class.

3. The method according to claim 1, wherein the weights associated with bandwidths assigned to individual classes are determined by at least one of an administrator and operator according to service environments.

4. The method according to claim 1, wherein the allowing of the OLT to perform the bandwidth distribution process according to the bandwidth requirement quantities of the individual classes using the weights pre-assigned to the individual classes further comprises:
  allowing the OLT to distribute a bandwidth to individual classes using a packet scheduling algorithm based on a round-robin scheme.

5. The method according to claim 1, wherein the predetermined ONU priority assigns a high priority to a specific ONU, which has most frequently used the residual bandwidth $BW_{REM}$ in recent times, when the residual bandwidth $BW_{REM}$ is allocated to the ONUs, such that self-similarity characteristics of Internet traffic can be reflected in the allocation process of the residual bandwidth $BW_{REM}$.

6. The method according to claim 1, wherein:
  the OLT transmits information associated with bandwidths of individual allocated classes to the ONUs using a GATE frame, and
  the ONUs transmit up-stream data contained in Queues of individual classes to the OLT using information associated with bandwidths of individual received classes.

7. The method according to claim 1, wherein the bandwidth allocation method is used when the sum of bandwidth requirement quantities of the ONUs is higher than a threshold value determined on the basis of a 1-cycle processing time assigned to the OLT.

8. The method according to claim 1, further comprising the step of:
  if the ONUs do not transmit REPORT messages to the OLT in a previous cycle, transmitting the REPORT messages to the OLT using an up-stream idle band ranging from the last time of the previous cycle to a specific time positioned before a first ONU of a current cycle transmits up-stream data.

9. A bandwidth allocation apparatus for guaranteeing a Quality of Service (QoS) in an Ethernet Passive Optical Access Network (EPON) comprising:
  a plurality of Optical Network Units (ONUs) for classifying up-stream data received from a plurality of user terminals to be transmitted to an Optical Line Terminal (OLT) into a plurality of classes according to predetermined data priority information in the EPON, and receiving bandwidths required for individual classes from the OLT; and
  the OLT for distributing a bandwidth from among an available total up-stream bandwidth to the ONUs according to bandwidth requirement quantities of individual classes using weights pre-assigned to individual classes, and re-distributing a residual bandwidth to the ONUs,
  wherein the up-stream data is received from each of the plurality of user terminals is classified into the plurality of classes, and
  wherein the OIL if the residual bandwidth $BW_{REM}$ is less than bandwidths requested by the ONUs, excluding a low-priority ONU according to a predetermined ONU priority until a value $$\frac{BW_{REM}}{N}$$

acquired when the residual bandwidth $BW_{REM}$ is divided by a predetermined number N equal to the number of ONUs is higher than a minimum Ethernet frame transmission-time, and allocates an up-stream bandwidth larger than a bandwidth corresponding to the minimum Ethernet frame transmission time to high-priority ONUs.

10. The apparatus according to claim 9, wherein each of the ONUs includes:
  a plurality of priority Queues for classifying the up-stream data according to individual classes in the order of the predetermined data priority information; and
  a scheduler for transmitting the up-stream data stored in the priority Queues to the OLT according to bandwidth allocation information received from the OLT.

11. The apparatus according to claim 9, wherein the OLT includes:
  a storage unit for storing a bandwidth requirement table which includes bandwidth requirement quantities of individual priorities and distance information between the ONUs and the OLT; and
  a bandwidth allocation unit for distributing the bandwidth to the ONUs according to the bandwidth requirement quantities of individual classes using the pre-assigned bandwidths of individual classes, and distributing a residual bandwidth to the ONUs.

12. An Optical Network Unit (ONU) apparatus for use in an Ethernet Passive Optical Access Network (EPON) comprising:
  a plurality of priority Queues for classifying the up-stream data received from a plurality of user terminals to be transmitted to an Optical Line Terminal (OLT) according to individual classes in the order of predetermined data priority information, and storing the classified up-stream data; and a scheduler for transmitting the up-stream data stored in the priority Queues to the OLT according to bandwidth allocation information received from the OLT, wherein a bandwidth assigned by the OLT is acquired when the OLT distributes a bandwidth from among an available total up-stream bandwidth to the ONUs having requested the bandwidth from the OLT according to bandwidth requirement quantities of individual classes using pre-assigned bandwidths of individual classes, and re-distributes a residual bandwidth to the ONUs, wherein the up-stream data is received from each of the plurality of user terminals is classified into the plurality of classes, and wherein if the ONUs do not transmit REPORT messages to the OLT in a previous cycle, transmit the REPORT messages to the OLT using an up-stream idle band ranging from the last time of the previous cycle to a specific time positioned before a first ONU of a current cycle transmits up-stream data.

13. An Optical Line Terminal (OLT) apparatus for use in an Ethernet Passive Optical Access Network (EPON) comprising:

a storage unit for classifying up-stream data received from a plurality of user terminals to be transmitted from a plurality of Optical Network Units (ONUs) into a plurality of classes according to predetermined data priority information, and storing a bandwidth requirement table which includes bandwidth requirement quantities of individual priorities associated with the ONUs and information of a distance to individual ONUs; and a bandwidth allocation unit for distributing a bandwidth to the ONUs according to the bandwidth requirement quantities of individual classes using pre-assigned weights of individual classes, and re-distributing a residual bandwidth to the ONUs, wherein the up-stream data is received from each of the plurality of user terminals is classified into the plurality of classes, and wherein the bandwidth allocation unit, if the residual bandwidth $BW_{REM}$ is less than bandwidths requested by the ONUs, excludes a low-priority ONU according to a predetermined ONU priority until a value $$\frac{BW_{REM}}{N}$$

acquired when the residual bandwidth $BW_{REM}$ is divided by a predetermined number N equal to the number of ONUs is higher than a minimum Ethernet frame transmission time, and allocates an up-stream bandwidth larger than a bandwidth corresponding to the minimum Ethernet frame transmission time to high-priority ONUs.

14. The apparatus according to claim 13, wherein the weights associated with bandwidths assigned to individual classes are determined by at least one of an administrator and operator according to service environments.

15. The apparatus according to claim 13, wherein the bandwidth allocation unit distributes a bandwidth to individual classes using a packet scheduling algorithm based on a round-robin scheme.

16. The apparatus according to claim 13, wherein the predetermined ONU priority assigns a high priority to a specific ONU, which has most frequently used the residual bandwidth $BW_{REM}$ in recent times, when the residual bandwidth $BW_{REM}$ is allocated to the ONUs, such that self-similarity characteristics of Internet traffic can be reflected in the allocation process of the residual bandwidth $BW_{REM}$.

17. The apparatus according to claim 13, wherein:

the OLT transmits information associated with bandwidths of individual allocated classes to the ONUs using a GATE frame.

* * * * *